United States Patent
Sharma et al.

(10) Patent No.: US 10,255,685 B2
(45) Date of Patent: Apr. 9, 2019

(54) COMPUTER IMPLEMENTED SYSTEM AND METHOD FOR IMAGE TEXTURE DETERMINATION

(71) Applicant: Tata Consultancy Services Limited, Mumbai (IN)

(72) Inventors: Monika Sharma, Gurgaon (IN); Hiranmay Ghosh, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 476 days.

(21) Appl. No.: 15/019,794

(22) Filed: Feb. 9, 2016

(65) Prior Publication Data
US 2016/0284100 A1 Sep. 29, 2016

(30) Foreign Application Priority Data
Mar. 25, 2015 (IN) .......................... 995/MUM/2015

(51) Int. Cl.
*G06T 7/40* (2017.01)
*G06K 9/62* (2006.01)
(Continued)

(52) U.S. Cl.
CPC .............. *G06T 7/40* (2013.01); *G06K 9/4642* (2013.01); *G06K 9/6212* (2013.01); *G06T 5/002* (2013.01);
(Continued)

(58) Field of Classification Search
CPC ..... G06T 7/40; G06T 7/44; G06T 7/11; G06T 5/002; G06T 5/003; G06T 5/40;
(Continued)

(56) References Cited

U.S. PATENT DOCUMENTS 6,173,083 B1 1/2001 Avinash
8,004,576 B2 8/2011 Sharma
(Continued)

FOREIGN PATENT DOCUMENTS

WO    WO-2014/111961    7/2014

OTHER PUBLICATIONS

Tuceryan, Mihran, and Anil K. Jain. "Texture analysis." Handbook of pattern recognition and computer vision. 1993. 235-276. (Year: 1993).*

(Continued)

*Primary Examiner* — Amandeep Saini
(74) *Attorney, Agent, or Firm* — Finnegan, Henderson, Farabow, Garrett & Dunner LLP

(57) ABSTRACT

This disclosure relates generally to image processing, and more particularly to image texture determination. In one embodiment a processor a memory coupled to the processor, wherein the processor coupled with a plurality of modules stored in the memory: At least one image having a plurality of pixels is accepted. Any noise is removed from the image to obtain at least one noise free image. The at least one noise free image is converted to at least one gray scale image. Horizontal and Vertical Gradient for plurality of pixels of the at least one gray scale image are computed. Gradient magnitude is calculated for the generated gradient. Histogram of the gradient magnitude is generated based on the gradient magnitude, and the plurality of generated histograms are compared with a plurality of predetermined histograms.

7 Claims, 7 Drawing Sheets

(51) Int. Cl.
*G06T 5/00* (2006.01)
*G06T 5/40* (2006.01)
*G06T 7/11* (2017.01)
*G06T 7/44* (2017.01)
*G06K 9/46* (2006.01)

(52) U.S. Cl.
CPC ............... *G06T 5/003* (2013.01); *G06T 5/40* (2013.01); *G06T 7/11* (2017.01); *G06T 7/44* (2017.01); *G06T 2207/10032* (2013.01); *G06T 2207/20021* (2013.01); *G06T 2207/30188* (2013.01)

(58) Field of Classification Search
CPC . G06T 2207/20021; G06T 2207/30188; G06T 2207/10032; G06K 9/4642; G06K 9/6212
USPC ........................................................ 382/108
See application file for complete search history.

(56) References Cited

U.S. PATENT DOCUMENTS

| 8,457,400 | B2 | 6/2013 | Wu et al. |
| 8,687,891 | B2 | 4/2014 | Takacs et al. |
| 2012/0099796 | A1 | 4/2012 | Zitnick, III |
| 2013/0258107 | A1 | 10/2013 | Delibaltov et al. |

OTHER PUBLICATIONS

Sen, D. et al. (Apr. 2010). "Gradient histogram: Thresholding in a region of interest for edge detection," *Center for Soft Computing Research, Indian Statistical Institute*, Image and Vision Computing, vol. 28, pp. 677-695.

* cited by examiner

FIGURE 3
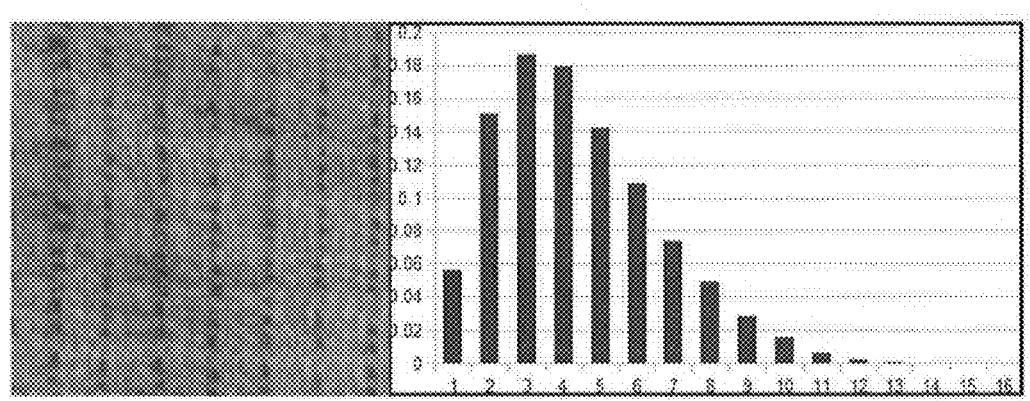
FIGURE 4A (I)
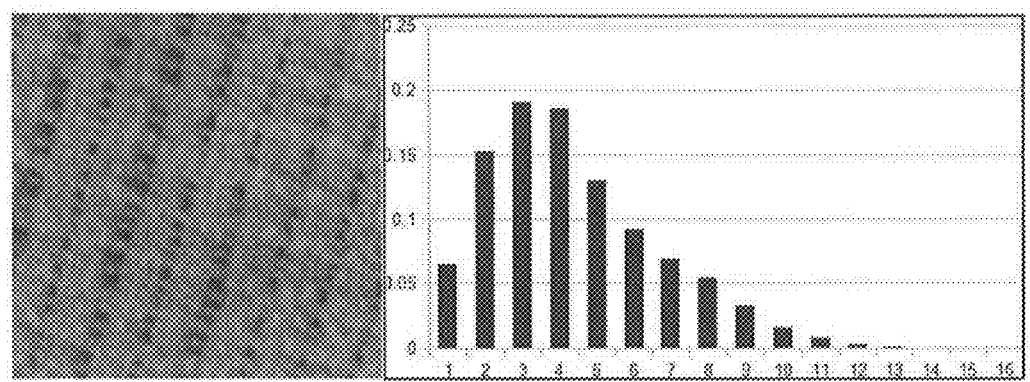
FIGURE 4A (II)

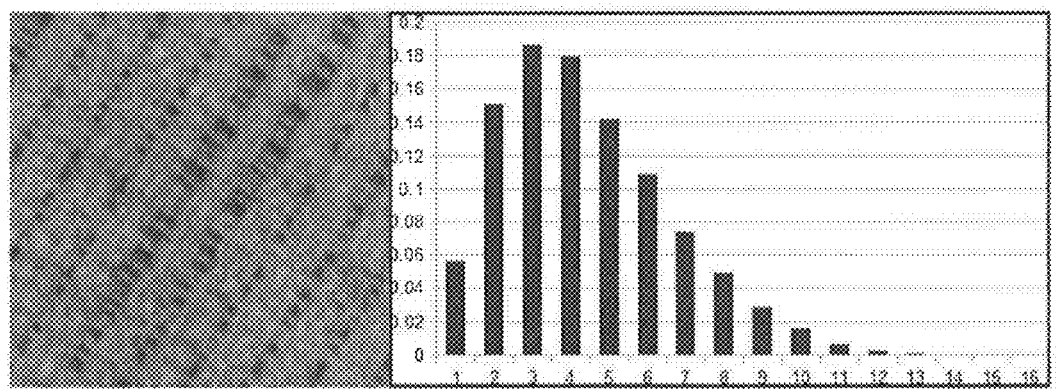
FIGURE 4A (III)
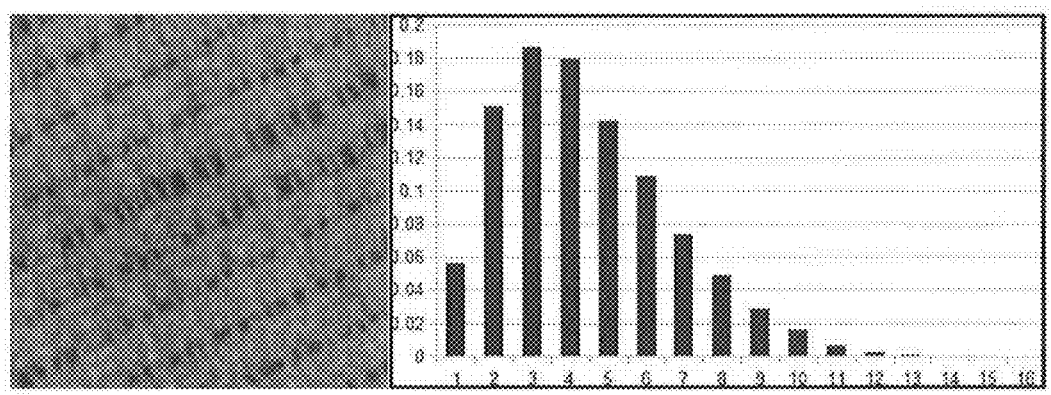
FIGURE 4A (IV)

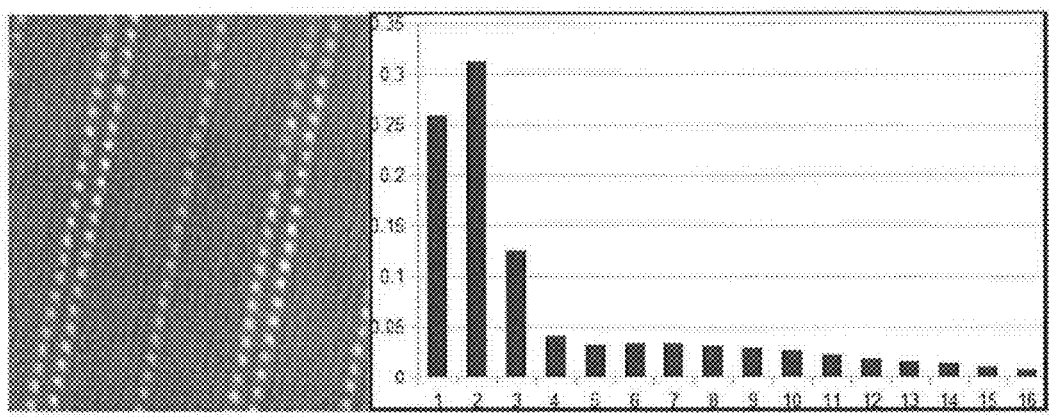
FIGURE 4B (II)
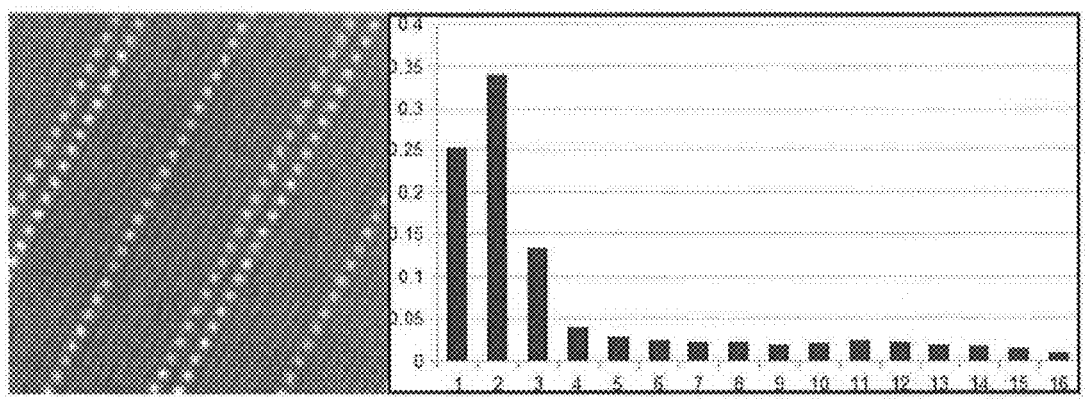
FIGURE 4B (III)

FIGURE 4B (IV)

COMPUTER IMPLEMENTED SYSTEM AND METHOD FOR IMAGE TEXTURE DETERMINATION

PRIORITY CLAIM

The present application claims priority to Indian Provisional Patent Application No.995/MUM/2015, filed on 25$^{th}$ Mar. 2015 the entirety of which is hereby incorporated by reference.

TECHNICAL FIELD

The present disclosure relates, in general, to image processing, and in particular, to a system and method of image texture determination.

BACKGROUND

The recent progress in the area of digital imaging and computing technology has resulted in an exponential increase in digital media data. Texture is one of the important features to facilitate search and classification of image data. Various texture descriptors are available that facilitate in determining important visual cues of the images texture like surface properties and orientation, which may be further used in various applications such as scene interpretation, image segmentation and object-detection in the field of computer vision. Examples of available texture descriptors includes, Histograms of Oriented Gradients (HOG), Local Binary Patterns (LBP), Rotation invariant-Local Binary Pattern (RLBP) and Rotation Invariant Histograms of Oriented Gradients.

However, the major challenge in the field of texture determination is that images are not always captured from the identical viewing angle in the real world. In many domains, such as textiles, nature photos and satellite images, the orientation of the objects can undergo significant rotation. And, it is highly onerous to ensure that captured images have the same degree of orientation between each other.

Conventionally, the existing texture descriptors are either sensitive to image rotation or are computationally expensive. HOG and LBP are two most commonly used texture descriptors in computer vision. Both the descriptors have low computational complexity, but are sensitive to rotation of texture patterns in images. There are a few rotation-invariant textures descriptors like RLBP and Rotation invariant HOG, which initially computes the LBP and HOG descriptors respectively, and introduce additional steps to align the local histograms to achieve rotation-independence. The additional step for achieving rotation invariance makes RLBP and Rotation Invariant HOG computationally expensive. Further, some of the texture features have high dimensionality resulting in higher computational and storage costs. For example, LBP and RLBP are represented as 256 dimensional 36 dimensional vectors respectively.

SUMMARY

Embodiments of the present disclosure present technological improvements as solutions to one or more of the above-mentioned technical problems recognized by the inventors in conventional systems.

A computer implemented system and method for image texture determination is disclosed. The system and method for image texture determination comprises a system processor to provide system processing commands, a system repository to store predetermined set of rules and a plurality of predetermined normalized histograms, an input module to receive at least one image, a noise removal module to remove noise from the at least one image to generate at least one noise free image, a gray scale converter module to convert the at least one noise free image to at least one gray scale image, a gradient module to compute a gradient in the at least one gray scale image in horizontal and vertical directions, a histogram generator module to generate a normalized histogram for the at least one gray scale image based on the gradient, and a texture determiner module to determine the image texture based on the normalized histogram.

It is to be understood that both the foregoing general description and the following detailed description are exemplary and explanatory only and are not restrictive of the invention, as claimed.

BRIEF DESCRIPTION OF ACCOMPANYING DRAWING

A preferred embodiment of the present disclosure will now be described with the help of the accompanying drawings, in which:

FIG. 3 illustrates an exemplary embodiment showing multiple images of an object having different orientations, in accordance with the present claimed subject matter;

Figure 4A:
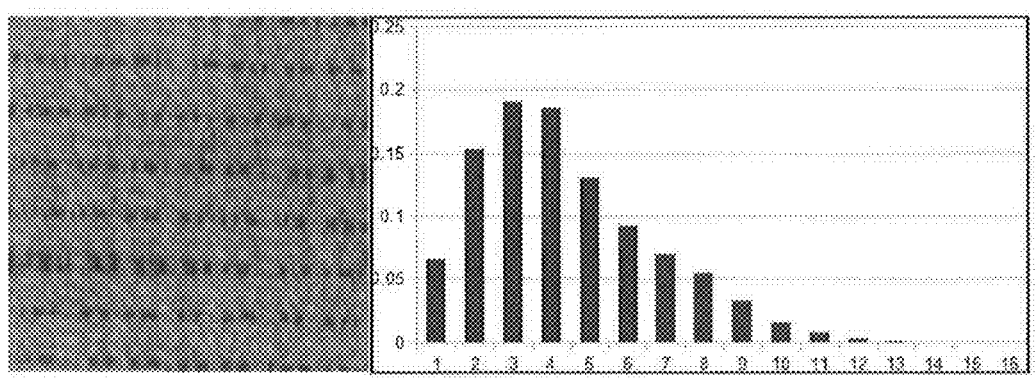
Figure 4B:
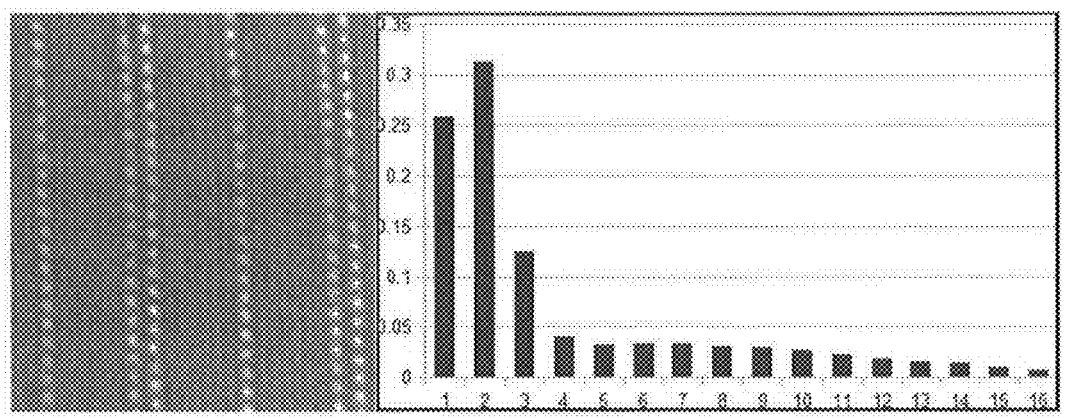
Figure 4B:
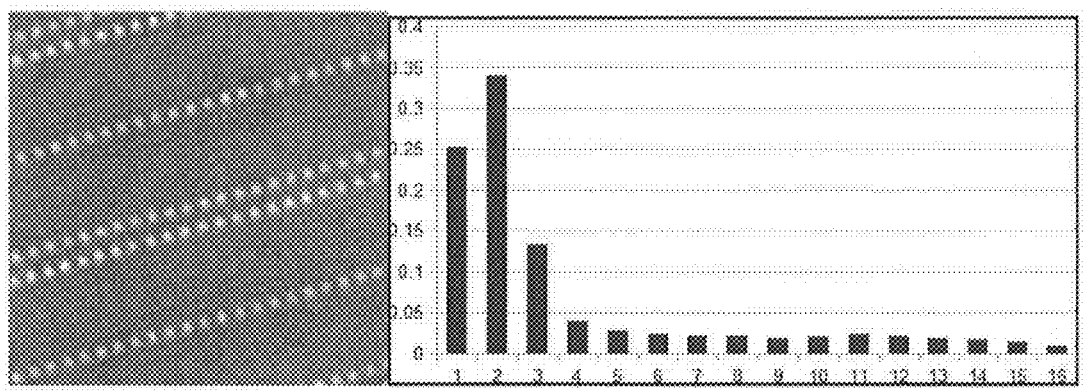
Figure 4B:
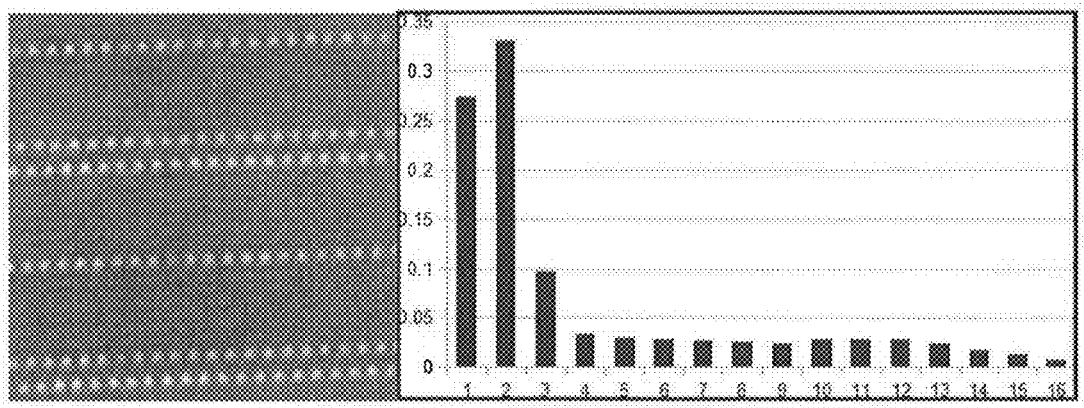

FIG. 4A (I to V) illustrates multiple images oriented at different angles of a first texture pattern and its corresponding Histogram of Gradient Magnitude (HGM), in accordance with the present claimed subject matter; and FIG. 4B (I to V) illustrates a multiple images oriented at different angles, of a second texture pattern 2 and its corresponding Histogram of Gradient Magnitude (HGM), in accordance with the present claimed subject matter.

DETAILED DESCRIPTION

Exemplary embodiments are described with reference to the accompanying drawings: in the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

A computer implemented system and method for image texture determination is described with reference to the embodiments shown in the accompanying drawings. The embodiments are not intended to limit the scope and ambit of the disclosure. The description relates purely to the examples and embodiments of the disclosed system and its suggested applications.

The description hereinafter, of the specific embodiments will so fully reveal the general nature of the embodiments herein that others ordinarily skilled in the art can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not limitation. Therefore, while the embodiments herein have been described in terms of preferred embodiments, those skilled in the art will recognize that the embodiments herein can be practiced with modification within the spirit and scope of the embodiments as described herein.

The present disclosure envisages a computer implemented system and method for determining image texture. The system generates a histogram of gradient magnitude for at least one image and then compares the generated histogram of gradient magnitude with the plurality of predetermined histogram's to determine the texture of the at least one image.

Figure 1:
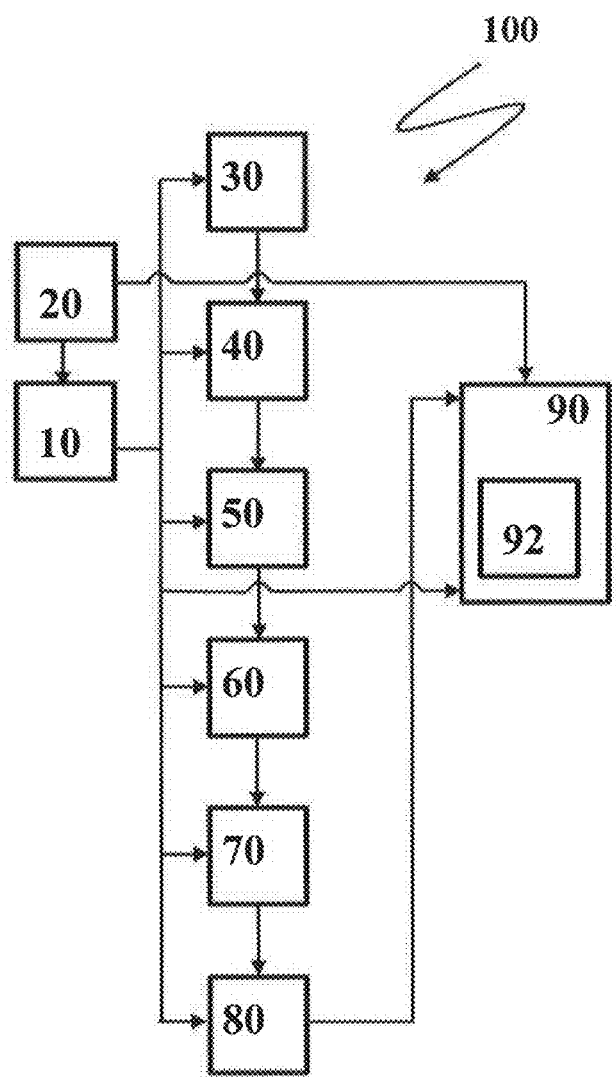
FIG. 1 illustrates a schematic diagram for a computer implemented system for image texture determination, in accordance with the present claimed subject matter.

Referring to FIG. 1, illustrates a system 100 for determining image texture. The system 100 comprises: a system processor 10, a system repository 20, an input module 30, a noise removal module 40, a gray scale converter module 50, a gradient module 60, a magnitude determiner 70, a histogram generator module 80 and a texture determiner module 90.

The system processor 10 is configured to receive the predetermined set of rules and possessing functional elements to provide system processing commands for determining image texture. The system processor 10 may be implemented as one or more microprocessors, microcomputers, microcontrollers, digital signal processors, central processing units, state machines, logic circuitries, and/or any devices that manipulate signals based on operational instructions. In one embodiment, the system processor 10 is configured to fetch and execute the predetermined set of rules stored in the system repository 20. In an exemplary embodiment, the predetermined set of rules may be associated with different functional elements.

The system repository 20 is configured to store a predetermined set of rules and a plurality of predetermined histograms. The plurality of predetermined histograms may he utilized for determining the texture of images, in an embodiment, the determination of image texture may include classifying the images and/or portions of the images into different texture classes. The system repository 20 may be pre-indexed with distinct labels, and the predetermined set of rules may be utilized for determination of image texture associated with any of distinct labels, in an exemplary embodiment, the system repository 20 may be indexed with labels pertaining to different garment-types such as sweaters, sarees, t-shirts, and so on. For determining a garment with a garment-type (for example, a shirt) with a texture similar to that in a given image (for example, an image of another shirt), the system 100 may facilitate in retrieving a set of garments indexed with said garment-type (for example, the shirt). In an embodiment, the predetermined set of rules may facilitate in computing the HGM texture-descriptor for the given image as well as for these set of shirts, and then matching texture patterns based on HGM, and retrieving the shirts with texture similar to that in the given image.

The system repository 20 may include any computer-readable medium known in the art including, for example, volatile memory (e.g., RAM), and/or non-volatile memory (e.g., EPROM, flash memory, etc). In an embodiment, the plurality of predetermined histograms may be computed using the system 100 and stored in the system repository 20. Herein, the plurality of predetermined histograms may refer to the histogram of gradient magnitudes that may be computed using a set of test images to define different classes. The predetermined histograms may be classified into different classes of textures, and stored in the system repository 20. In some embodiments, said predetermined histograms may be classified into existing/known texture classes. In some other embodiments, when the predetermined histograms cannot be classified into any suitable known textures classes, new texture classes may be defined. In various embodiments, the predetermined histograms may be stored in the system repository 20 or may be retrieved by an external source. For example, the predetermined histograms may be received from a memory configured outside the system 100. In an example embodiment, the predetermined histograms may be received at the system 100 through wired means or wirelessly.

The input module 30 is operatively coupled with the system processor 10 to receive system processing commands and is further configured to accept at least one image for determining the image texture. In an embodiment, the input module 30 may accept the at least one image directly from a camera, a flash memory, image databases or any such image sources. In another embodiment, the, images accepted by the input module 30 may be oriented at different angles. Referring to FIG. 3, an exemplary embodiment where multiple images of an object, for example an airplane having different orientation is illustrated.

The noise removal module 40 is operatively coupled with the system processor 10 to receive system processing commands and the input module 30 to receive the at least one image, The noise removal module 40 is further configured to remove noise from said plurality of pixels of the at least one image to obtain at least one noise free image corresponding to the at least one image. In an embodiment, the noise removal module 40 may utilize Gaussian blur technique to remove the noise from the images. In an embodiment, the kernel size in the Gaussian blur technique is typically set in a range of 3-7. The kernel size of the Gaussian blur technique may depend on factors, such as user requirements, application environment and the like.

The gray scale converter module 50 is configured to cooperate with the system processor 10 to receive system processing commands and the noise removal module 40 to receive the at least one noise free image. The gray scale converter module 50 is further configured to convert the at least one noise free image into a corresponding at least one gray scale image. In an embodiment, the noise free colored image may have three channels. The noise free colored image is converted to corresponding gray scale images to reduce the dimensionality without any loss of relevant information as the gray scale images have only one channel. In an embodiment, gray scale converter module 50 for converting the noise free image to the gray scale image uses methods including: Average Method, Weighted or Luminosity Method, Lightness method and the like.

The gradient module 60 is configured to cooperate with the system processor 10 to receive the system processing commands. The gradient module 60 is configured to cooperate with the gray scale converter module 50 to receive the at least one gray scale image. The gradient module 60 is further configured to compute a gradient in horizontal and vertical directions for a plurality of pixels of each of said gray scale image. In an embodiment, the gradient module 60 utilizes filters for computing a gradient in horizontal and vertical directions. Examples of the filters includes: Sobel filter, Prewitt filter, Robert filter and the like.

In exemplary embodiment, wherein the gradient in horizontal direction for each of the plurality of pixels of the gray scale image is computed as (using Sobel filter):

$$G_x = \begin{pmatrix} -1 & 0 & 1 \\ -2 & 0 & 2 \\ -1 & 0 & 1 \end{pmatrix} * I_{gray}$$

and for the gradient in the vertical direction is computed as:

$$G_y = \begin{pmatrix} -1 & -2 & -1 \\ 0 & 0 & 0 \\ 1 & 2 & 1 \end{pmatrix} * I_{gray}$$

Wherein, $I_{gray}$ represents a gray scale image.

The magnitude determiner 70 is configured to cooperate with the system processor 10 to receive the system processing commands and with the gradient module 60 to receive the gradients in horizontal and vertical directions for the plurality of pixels corresponding to said gray scale image. The magnitude determiner 70 is further configured to compute a gradient magnitude for the plurality of pixels of said gray scale image.

In one embodiment, the gradient magnitude $G_{mag}$ is computed as:

$$G_{mag} = \sqrt{(G_x^2 + G_y^2)}$$

wherein $G_x$ represents the gradient of a pixel in horizontal direction and Gy represents the gradient of the pixel in vertical direction.

The histogram generator module 80 is configured to cooperate with the system processor 20 to receive system processing commands and the magnitude determiner 70 to receive the gradient magnitude for plurality of pixels of said gray scale image. The histogram generator module 80 is further configured to generate a histogram of gradient magnitude for said gray scale image.

In an embodiment, histogram of gradient magnitudes (HGM) is generated based on this mathematical equation:

$$HGM(c) = \sum_{i=1}^{N} \sum_{j=1}^{M} f(G_{mag}(i, j), c), k \in [0, C-1]$$

where $$f(G_{mag}(i, j), c) = \begin{cases} 1, & \text{if } G_{mag}(i, j)/C = c, \\ 0, & \text{if otherwise.} \end{cases}$$

wherein, C represents the number of bins of the histogram. In an embodiment, the value of C=16 bins, which means that the magnitude values of gradient ($G_{mag}$) are quantized into 16 bins for generating the histogram. Since the HGM is computed based only on the magnitudes of the gradient (and precludes the orientation), HGM provides a low dimensionality and hence requires less storage memory and processing time for comparison purpose. Herein, $G_{mag}$ (i, j) is the gradient magnitude of pixel (i, j) of gray scale image of size N×M, and HGM (c) is the Cth bin value of histograms gradient-magnitude.

In another embodiment, generated HGM is normalized based on this mathematical equation:

Normalized HGM(c)=HGM(c)/(N×M).

In one another embodiment, the (HGM) is generated based on the gradient magnitudes only, the generated HGM is rotational invariant i.e. independent of rotation of texture pattern of images. The HGM is naturally rotational invariant, i.e., unlike other rotation invariant texture descriptors like RLBP and Rotation Invariant HOG, HGM does not require an additional processing step for providing a histogram which is independent of rotation, thus requires less computational time. Further, RLBP and Rotation invariant HOG have high dimensionality resulting in higher computational and storage costs. For example, LBP and RLBP are represented as 256 dimensional 36 dimensional vectors respectively. HGM is computed by quantizing the magnitude values into 16 bins. Thus, HGM has a low dimensionality and hence, requires less storage-memory and processing time for matching.

Referring to FIG. 4A (I to V) illustrates multiple images oriented at different angles of a first texture pattern, and its corresponding Histogram of Gradient Magnitude (HGM), As illustrated, the Histogram of Gradient Magnitude is same for all of the multiple images oriented at different angles i.e., HGM is independent of rotation of images.

Similarly, FIG. 4B (I to V) illustrates multiple images oriented at different angles of a second texture pattern, and its corresponding Histogram of Gradient Magnitude (HGM). In this case also, the HGM is same for multiple images oriented at different orientations, i.e. HGM is independent of rotation of images.

The texture determiner module 90 having a comparator 92 is configured to cooperate with the system processor 10 to receive system processing commands, the system repository 20 to receive the plurality of predetermined normalized histograms and the histogram generator module 80 to receive the histogram of gradient magnitude for said gray scale image. The texture determiner module 90 is further configured to compare the generated histogram of gradient magnitude with the plurality of the predetermined histograms to determine the image texture.

In an embodiment, the texture determiner may use HGM along with HOG, LBP, and RLBP for determination of image texture.

In another embodiment, since HGM is rotation invariant, the system 100 for determining the texture descriptors (HGM) of image may be further used for various applications such as scene interpretation, image segmentation, satellite imagery, object detection, and the like. In an exemplary embodiment wherein system 100 is used for object detection, the input module 30 of the system 100 is configured to accept a plurality of images of the object, where the pluralities of images are aligned at different orientations, the noise removal module 40 is configured to receive the plurality of images and further remove noise from the plurality of images to generate a plurality of noise free image. The gray scale converter module 50 is configured to receive said plurality of noise free images and convert the plurality of noise free image into a plurality of gray scale images. The gradient module 60 is configured to receive said plurality of gray scale images and further configured to compute a gradient in horizontal and vertical direction for the plurality of pixels of each of said plurality of gray scale images. The magnitude determiner module 70 is configured to compute gradient in horizontal and vertical direction for the plurality of pixels of each of said plurality of gray scale images, and compute a gradient magnitude for the plurality of gray scale pixels of each of said plurality of gray scale images. The histogram generator module 80 is configured to receive said gradient magnitude further configured to generate a histogram of gradient magnitude for each of said gray scale images based on said receive gradient magnitude. The texture determiner module 90 having the comparator 92 is configured to compare the generated histogram of gradient magnitude with the plurality of predetermined histograms to determine the texture of the plurality of images. Since the texture is determined based only on the gradient magnitudes and not on the orientations, the determined texture is independent of rotation of plurality of images. Accordingly, the HGM computed for the plurality of images having different orientation would be same, as already described and illustrated by way of example in FIGS. 4A (I to V) and 4B (I to V).

Figure 2:
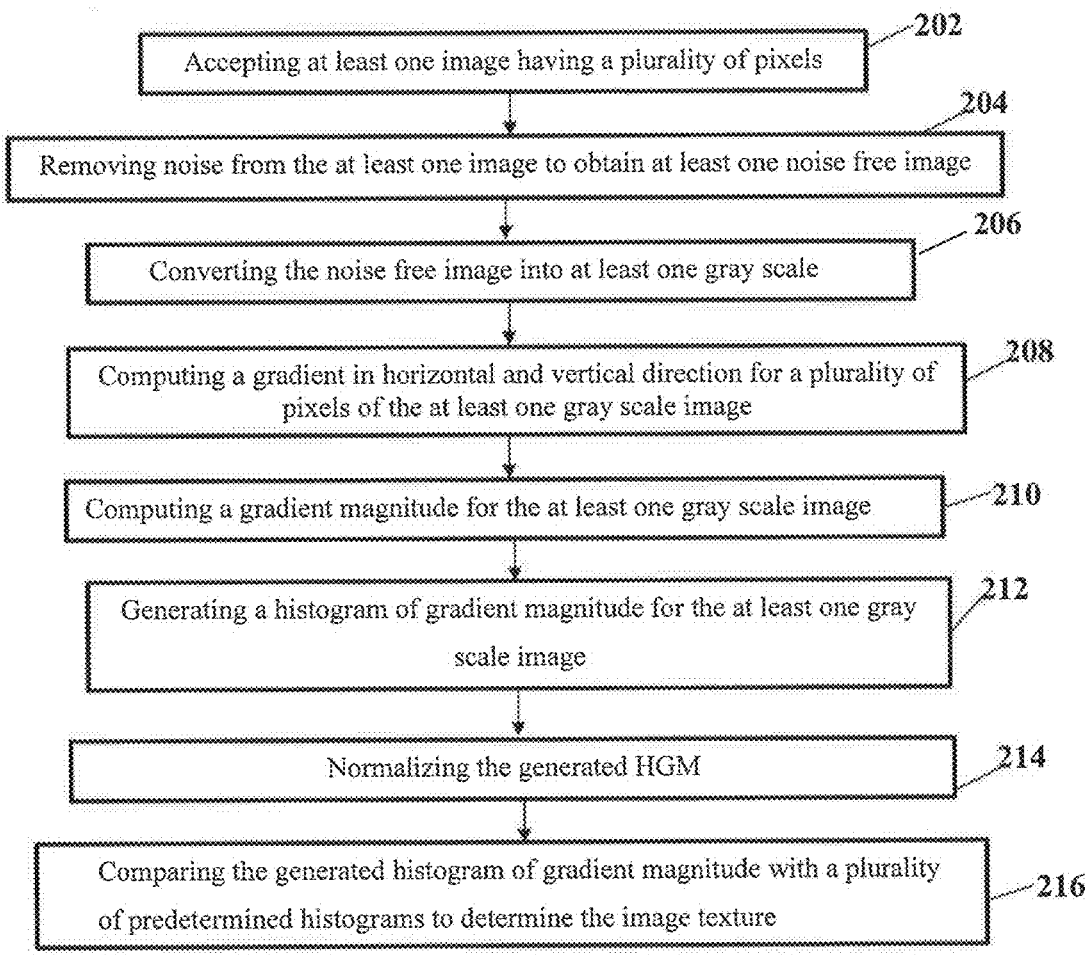
FIG. 2 illustrates a flow diagram showing the steps involved in image texture determination, in accordance with the present claimed subject matter.

Referring to FIG. 2, illustrates a flow diagram 200 shows the steps involved in image texture determination.

In step 202, at least one image having plurality of pixels is accepted by the input module 30 (shown in FIG. 1).

In step 204, noise is removed from said images to obtain at least one noise free image by the noise removal module 40 (shown in FIG. 1). In an embodiment the noise is removed using Gaussian blur technique wherein kernel size is set to 3-7.

In step 206, said at least one noise free image is converted into at least one gray scale image by the gray scale converter module 50 (shown in FIG. 1). In an embodiment, the at least one noise free image is converted into the gray scale image using methods including: Average Method, Weighted or Luminosity Method, Lightness method and the like, In step 208, a gradient in horizontal and vertical direction is computed for each of the pixels of the at least one gray scale image by the gradient module 60 (shown in FIG. 1). In an embodiment, a gradient in horizontal and vertical direction for the pixels of the gray scale image is computed using the filters including: Sobel filter, Prewitt filter, Robert filter and the like.

In step 210, a gradient magnitude for the plurality of gray scale pixels of said at least one gray scale image is computed by the magnitude determiner 70 (shown in FIG. 1). In one of the embodiment gradient magnitude Gmag is computed as:

$$G_{mag} = \sqrt{(G_x^2 + G_y^2)}$$

wherein $G_x$ represents the gradient of a pixel of the gray scale image in horizontal direction and $G_y$ represents the gradient of pixel in vertical direction.

In step 212, a histogram of gradient magnitude for said gray scale image is generated by the histogram generator module 80 (shown in FIG. 1). In an embodiment, histogram of gradient magnitude (HGM) is generated based on this mathematical equation:

$$HGM(c) = \sum_{i=1}^{N} \sum_{j=1}^{M} f(G_{mag}(i, j), c), k \in [0, C-1]$$

where $$f(G_{mag}(i, j), c) = \begin{cases} 1, & \text{if } G_{mag}(i, j)/C = c, \\ 0, & \text{if otherwise.} \end{cases}$$

wherein, C represents the number of bins of the histogram. In another embodiment, C=16 bins, which means that the magnitude values is quantize into 16 bins for generating the histogram, which makes HGM low dimensionality and hence requires less storage memory and processing time for comparison purpose. $G_{mag}$ (i, j) is the gradient magnitude of pixel (i, j) of gray scale image of size N×M, HGM(c) is the Cth bin value of histograms gradient-magnitude.

In step 214, the generated HGM is normalized based on this mathematical equation:

Normalized HGM(c)=HGM(c)/(N×M).

Herein, the generated histogram of gradient magnitude (HGM) is rotational invariant i.e. independent of rotation of texture pattern of images.

In step 216, the generated histogram of gradient magnitude is compared with a plurality of predetermined histograms to determine the texture of the image by the texture determiner module 90 (shown in FIG. 1). In an embodiment, the texture determiner may use HGM with HOG, LBP, and RLBP or any other texture descriptor for determination of image texture.

In an embodiment, determined image texture may be further used for scene interpretation, image segmentation or object detection.

In an exemplary embodiment, the texture descriptor HGM may be utilized for image segmentation application, where the image is partitioned into multiple segments. The image can be subdivided into m×n rectangular segments of equal sizes, by drawing m−1 equidistant horizontal lines and n−1 equidistant vertical lines through the image. The system 100 may be configured to compute a local HGM for each of the plurality of individual segments. Thus, the texture of the image is represented as a plurality of Local Histogram of Gradient Magnitudes (LHGM), which enables fine-grained comparison of textures of plurality of images or image segments. The segmentation can he done in various ways.

In another exemplary embodiment, the HGM may be computed for the application of satellite imagery. A satellite image of a geographical area may be captured and sent to the system 100. The geographical area may include different textures, for example, textures corresponding to river, roads, trees, mountains and so on. The system 100 may accept the image of the geographical area and partition the image into a plurality of image segments. Further the system 100 may compute a plurality of histograms corresponding to the plurality of image segments and compare the computed plurality of histograms with the plurality of predetermined histograms stored in the repository 20 of the system 100. Based on the comparison, the system 100 may classify each of the plurality of histograms into different texture classes. The classification of the plurality of histograms into different texture classes can he performed in a similar manner as explained above. For example, the components of the system 100 such as the system processor 10, the system repository 20, the input module 30, noise removal module 40, the gray scale converter module 50, the gradient module 60, the magnitude determiner 70, and the histogram generator module 80 may cooperate within the system 100 in a manner described in preceding paragraphs above to generate the plurality of histograms of gradient magnitude for the plurality of image segments.

In one another exemplary embodiment, a set of histograms from among the plurality of histograms that are classified in one texture class may be clustered together, thereby providing a plurality of clusters of histograms, where each cluster is indicative of a distinct texture class. For example, the histogram for all the segments of the geographical area including the trees can be clustered together based on the histograms of such segments. Similarly, the histogram for all the segments of the geographical area including the water body (such as rivers or sea) can be clustered together. As is seen here, the HGM may facilitate in classifying different regions of the geographical area based on the determination of textures said areas.

Throughout the description and claims of this complete specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

The term "an image" and "at least one image" may refer to a single image or plurality of images. The term "an image" and "at least one image" may be used interchangeably throughout the description and claims of this disclosure.

For a firmware and/or software implementation, the methodologies can be implemented with modules (e.g., procedures, functions, and so on that perform the functions described herein. Any machine readable medium tangibly embodying instructions can be used in implementing the methodologies described herein. For example, software codes and programs can be stored in a memory and executed by a processing unit.

In another firmware and/or software implementation, the functions may be stored as one or more instructions or code on a non-transitory computer-readable medium. Examples include computer-readable media encoded with a data structure and computer-readable media encoded with a computer program. The computer-readable media may take the form of an article of manufacturer. The computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk, and Blue-ray disc where disks usually reproduce data magnetically, while discs reproduce data optically with lasers. Combinations of the above should also be included within the scope of computer-readable media.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

The technical advancements of the system envisaged by the present disclosure include the realization of: a system and method for image texture determination which is independent of rotation of image, a system and method for image texture determination which is memory-efficient, a system and method for image texture determination which has low dimensionality; and a system and method for image texture determination which is computationally time-efficient.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to he comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

It is intended that the disclosure and examples be considered as exemplary only, with a true scope and spirit of disclosed embodiments being indicated by the following claims.

What is claimed is:

1. A computer implemented system for determining image texture, said system comprising:
   a processor;
   a memory coupled to the processor, wherein the processor is coupled with a plurality of modules stored in the memory, and wherein the plurality of modules comprises:
      an input module that accepts at least one image having a plurality of pixels;
      a noise removal module that receives said at least one image and is further configured to remove noise from the at least one image to obtain at least one noise free image;
      a gray scale converter module that receives the at least one noise free image and is further configured to convert the at least one noise free image into at least one gray scale image;

a gradient module that receives at least one gray scale image and is further configured to compute a gradient in horizontal and vertical direction for a plurality of pixels of the at least one gray scale image;

a magnitude determiner that receives said gradient in horizontal and vertical direction for said plurality of pixels of the at least one gray scale image and is further configured to compute a gradient magnitude for the plurality of pixels of the at least one gray scale image;

a histogram generator module receives said gradient magnitude for the plurality of pixels of said at least one gray scale image and is further configured to generate a histogram of gradient magnitude for said at least one gray scale image based on said received gradient magnitude; and a texture determiner module having a comparator that receives said plurality of predetermined histogram and receives said generated histogram of gradient magnitude for the said gray scale image and is further configured to compare the generated histogram of gradient magnitude with a plurality of predetermined histograms to determine the image texture.

2. The system as claimed in claim 1, wherein the noise removal module is configured to use Gaussian blur technique to remove noise from the at least one image.

3. The system as claimed in claim 1, wherein the generated histogram of gradient magnitude is independent of rotation of the at least one image.

4. A computer implemented method for determining image texture, said method comprising:

accepting, by a processor, at least one image having a plurality of pixels;

removing, by the processor, noise from the at least one image to obtain at least one noise free image;

converting, by the processor, the at least one noise free image into at least one gray scale image;

computing, by the processor, a gradient in horizontal and vertical direction for a plurality of pixels of the at least one gray scale image;

computing, by the processor, a gradient magnitude for the at least one gray scale image;

generating, by the processor, a histogram of gradient magnitude for the at least one gray scale image; and comparing, by the processor, the histogram of gradient magnitude with a plurality of predetermined histograms to determine the image texture.

5. The method as claimed in claim 4, wherein the generated histogram of gradient magnitude is rotational invariant.

6. The method as claimed in claim 4, further includes storing the plurality of predetermined histograms.

7. A non-transitory computer-readable medium having embodied thereon a computer program for executing a method for determining image texture, the method comprising:

accepting a plurality of images having a plurality of pixels;

removing noise from at least one image to obtain at least one noise free image;

converting the at least one noise free image into at least one gray scale image;

computing a gradient in horizontal and vertical direction for a plurality of pixels of the at least one gray scale image;

computing a gradient magnitude for the at least one gray scale image;

generating a histogram of gradient magnitude for the at least one gray scale image; and comparing the generated histogram of gradient magnitude with a plurality of predetermined histograms to determine the image texture.

* * * * *